United States Patent [19]

Wu

[11] Patent Number: 5,072,769
[45] Date of Patent: Dec. 17, 1991

[54] CUSHION DEVICE FOR A SUN VISOR USED ON AN AUTOMOBILE WINDOW

[76] Inventor: Hans Wu, No. 78, Chung-Shan Wu St., Tainan City, Taiwan

[21] Appl. No.: 654,823

[22] Filed: Feb. 13, 1991

[51] Int. Cl.⁵ .............................................. B60J 3/00
[52] U.S. Cl. ................................ 160/370.2; 160/323.1; 160/903
[58] Field of Search ................... 160/370.2, 903, 23.1, 160/24, 98, 31, 41, 323.1; 296/37.16, 95.1, 97.7, 97.8

[56] References Cited

U.S. PATENT DOCUMENTS

| | | | |
|---|---|---|---|
| 2,594,386 | 4/1952 | Blessen | 160/370.2 X |
| 3,410,601 | 11/1968 | Thompson | 160/370.2 X |
| 4,736,980 | 4/1988 | Eubanks | 160/370.2 X |
| 4,823,859 | 4/1989 | Park | 160/370.2 |
| 4,951,909 | 8/1990 | Russo et al. | 160/903 X |

Primary Examiner—David M. Purol
Attorney, Agent, or Firm—Harness, Dickey & Pierce

[57] ABSTRACT

A cushion device used in conjunction with a sun visor mounted on an automobile window includes a holding portion having a groove therein and a resilient stand connected to the holding portion.

3 Claims, 3 Drawing Sheets

CUSHION DEVICE FOR A SUN VISOR USED ON AN AUTOMOBILE WINDOW

BACKGROUND OF THE INVENTION

The invention relates to a cushion device, more particularly to a cushion device used in conjunction with a sun visor which is to be mounted on a piece of window glass of an automobile.

DISCUSSION OF THE RELATED ART

Sun shielding devices are mounted on windows to keep the scorching sun rays from getting into vehicles or the houses and to provide privacy. The present invention relates particularly to a sun visor mounted on a window glass of an automobile.

FIG. 1 shows a perspective illustration of a sun visor (1) which can be detachably mounted on a glass of an automobile. Accordingly, it includes a frame (14) having a suction cup (15) attached thereto, and a shaft (12) with two free ends thereof. The shaft (12) is spaced apart from the glass of the automobile. The frame (14) is swingable about the suction cup. The sun visor further includes a sun shielding screen (11) having a first end connected to the shaft (12) and a second end having a peg member (13). The suction cup (15) is depressed to stick on the glass (A) to hold the frame (1) containing the sun shielding screen in position. To use, the sun shielding screen is pulled out from the frame and held extended by a hook member (13) on or near the opposite edge of the window edge. When not in use, the screen can be retracted into the frame. This type of sun visor though has been accepted and liked by the consumer generally, but still has a some disadvantages.

Since the sun visor is mounted on a car window glass (A) by only a suction cup (15), as shown in FIG. 2, the frame (14) will vibrate in the direction indicated by the arrows. Thus, excessive sound due to the two ends (1A,1B) of the frame knocking against the glass intermittently is produced when the automobile is in motion.

This noise though can be eliminated just by removing the sun visor when it is not in use, and remounting it when one wants to use it again. To do so, however is very inconvenient.

SUMMARY OF THE INVENTION

Therefore, it is an object of the present invention is to provide a cushion device to be used in conjunction with the sun visor described above, so as to correct the above mentioned drawbacks.

A cushion device produced according to the present invention includes a holding portion having a groove therein and a resilient stand connected to that holding portion. Two such cushion devices are respectively mounted on the free ends of the shaft of the frame of the sun visor described above in such a manner that the free ends the shaft are extended into the grooves of the holding portions of the cushion devices while the resilient stands of the same bias the window glass on which the sun visor is mounted thereon.

BRIEF DESCRIPTION OF THE DRAWING

The foregoing objectives, other features and advantages of the present invention will be better understood upon consideration of the following detailed description, including drawings, all of which show a non-limiting form of the present invention, and of which.

DETAILED DESCRIPTION OF THE PREFERRED EMBODIMENT

Figure 2:
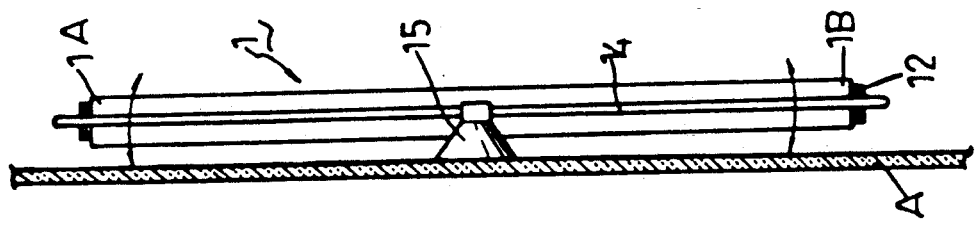
FIG. 2 is a elevational view of the sun visor of FIG. 1 with the sun shielding screen retracted.
Figure 1:
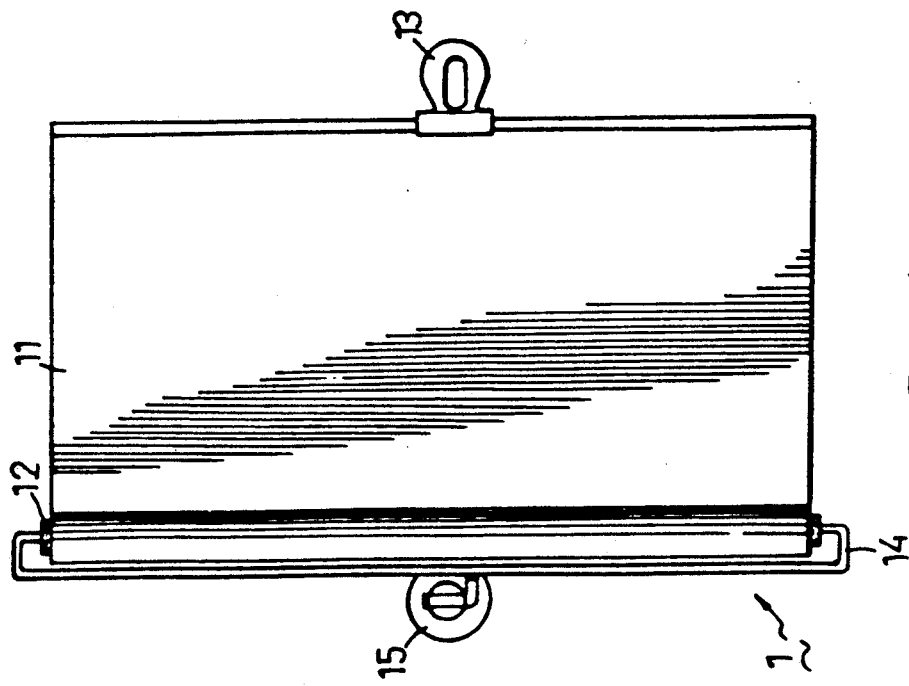
FIG. 1 shows a sun visor of the prior art used in an automobile with the sun shielding screen being stretched out.
Figure 3:
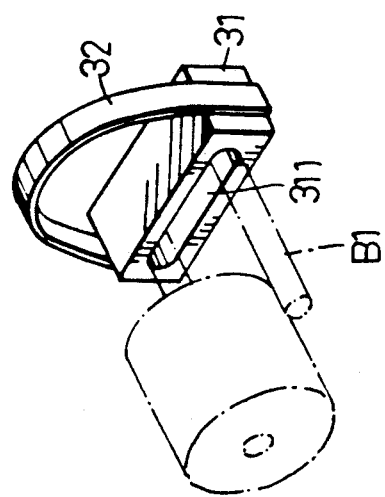
FIG. 3 shows a schematic view of a first preferred embodiment of a cushion device according to the present invention.

Referring to FIG. 3, a first preferred embodiment of a cushion device (2) of the present invention includes a holding portion (21) having a groove (211) therein, and a resilient stand (22) connected to the holding portion (21). For the resilient stand (22) to abut a surface properly, a flat face (221) is generally provided at the end thereof.

Figure 9:
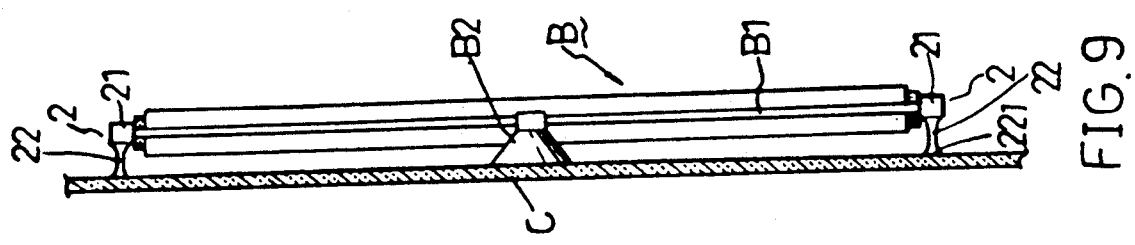
FIG. 9 shows two cushion devices of the present invention used in conjunction with the sun visor of the prior art.

Two such cushion devices (2) are respectively mounted on the free ends of the shaft (B1) of the frame (B) of the sun visor described above in such a manner that the free ends of the shaft extend into the grooves (211) of the holding portion (21) while the resilient stands (22) abut the window glass (C) on which the sun visor is mounted as shown in FIG. 9. After thus mounted, the sun visor will not vibrate against the window glass no matter how a driver operates a car, since the shaft is held in such a manner that it can not move against the window.

Figure 4:
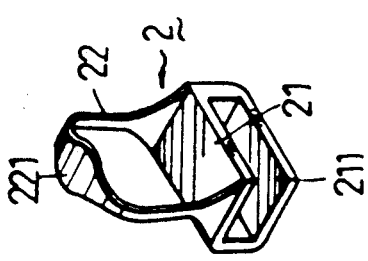
FIG. 4 shows a schematic view of a second preferred embodiment of a cushion device according to the present invention.

In one embodiment, the groove (311) of the holding portion (31) of the cushion device is closed at one end thereof, so that the free ends of the shaft (B1) extended into such holding portion are fully enveloped by the holding portion, as shown in FIG. 4. The feature and function of this embodiment is same a the first embodiment.

Figure 5:
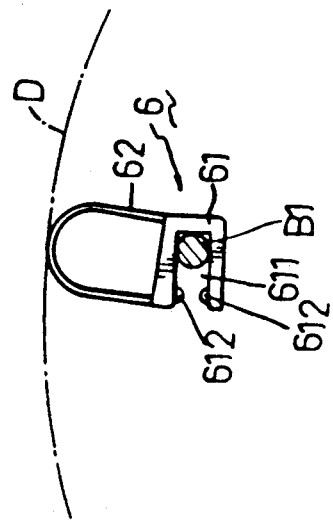
FIG. 5 shows a schematic view of a third preferred embodiment of a cushion device according to the present invention.
Figure 7:
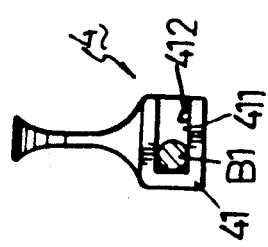
FIG. 7 shows a schematic view of a fifth preferred embodiment of a cushion device according to the present invention.
Figure 8:
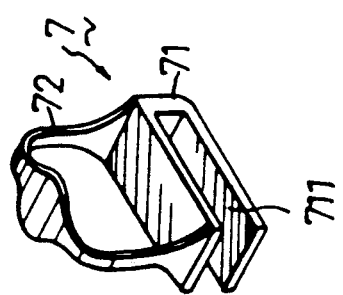
FIG. 8 shows a schematic view of a sixth preferred embodiment of a cushion device according to the present invention.

In another embodiment, the holding portion of the cushion device (4,6,7) is a U-shaped frame (41,61,71) with two arms thereof, and a link interconnecting the two arms and the resilient stand is connected to one of the arms, as shown in FIGS. 8, 5 and 7. A projection (412) extends from the tip portion of one arm into the groove (411) of the holding portion, as shown in FIG. 5, and it's purpose is to prevent the shaft (B1) from sliding out of the grooves (411).

In another embodiment, the U-shaped frame of holding portion has two projections (612) which extended into the groove (611). Their purpose is to prevent the shaft (B1) from sliding out of the groove (611). In this embodiment, the free ends of the two arms are longer than the link connecting them so that one arm bends outward. Thus, the resilient stand (62) mounted on said arm is slightly inclined from a line drawn perpendicular to the shaft (B1) and can abut the window glass (D) of an automobile more effectively, as shown in FIG. 7. The features and functions of these embodiments are similar to the first preferred embodiment.

Figure 6:
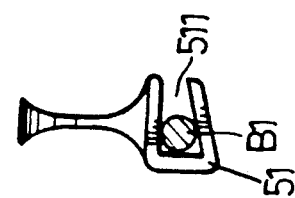
FIG. 6 shows a schematic view of a fourth preferred embodiment of a cushion device according to the present invention.

In still another embodiment, the free ends of the U-shaped frame (51) of the holding portion converge so as to prevent the shaft (B1) from sliding out of the groove (511), see FIG. 6. The feature and function of this embodiment are similar to the first preferred embodiment.

With this invention thus explained, it is obvious to those skilled in the art that numerous modifications and variations can be made without departing from the scope and spirit of the present invention. It is therefore, intended that this invention be limited only as indicated in the appended claims.

I claim:

1. A sun visor including a frame having a suction cup and a shaft with two free ends thereof, said frame being mounted on the glass of an automobile by said suction cup, said shaft being spaced apart from said glass and said shaft being swingable about said suction cup, said sun visor further including a retractable sun shielding screen mounted on said shaft, wherein the improvement is characterized in that said sun visor further has a cushion device including a holding portion and a resilient stand connected to said holding portion, said holding portion having a groove therein, a projection extending into said groove and two said cushion devices being respectively mounted on the free ends of said shaft in such a manner that the free ends of the same extended into said grooves of said holding portions while said resilient stands abut said glass of said automobile, said projection preventing said shaft from disengaging from said holding portion.

2. A sun visor as claimed in claim 1, wherein said holding portion is a substantially U-shaped frame having two arms and a link inter-connecting said two arms.

3. A sun visor as claimed in claim 2, wherein the free ends of said two arm have a distance greater than the distance of said link, said resilient stand being mounted on one of said arms, said resilient stand being slightly inclined from a line drawn perpendicular to said shaft.

* * * * *